(12) United States Patent
Low

(10) Patent No.: US 10,769,593 B2
(45) Date of Patent: Sep. 8, 2020

(54) HANDLING EMAIL FLOWS ARISING FROM TRANSACTIONS INITIATED WITH A SHARED PRIVILEGED IDENTITY AT A SERVICE PROVIDER

(71) Applicant: International Business Machines Corporation, Armonk, NY (US)

(72) Inventor: Chee Meng Low, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 15/607,741

(22) Filed: May 30, 2017

(65) Prior Publication Data
US 2018/0349853 A1    Dec. 6, 2018

(51) Int. Cl.
| | | |
|---|---|---|
| *H04L 29/06* | (2006.01) | |
| *G06Q 10/10* | (2012.01) | |
| *G06F 21/41* | (2013.01) | |
| *H04L 12/58* | (2006.01) | |

(52) U.S. Cl.
CPC ............ *G06Q 10/107* (2013.01); *G06F 21/41* (2013.01); *H04L 51/14* (2013.01); *H04L 63/0815* (2013.01); *H04L 63/102* (2013.01); *H04L 63/108* (2013.01)

(58) Field of Classification Search
CPC ....... G06Q 10/107; G06F 21/41; H04L 51/00; H04L 63/102; H04L 63/108
See application file for complete search history.

(56) References Cited

U.S. PATENT DOCUMENTS

| | | | | |
|---|---|---|---|---|
| 8,171,089 | B2* | 5/2012 | Nersu | H04L 51/28 709/206 |
| 2001/0044829 | A1* | 11/2001 | Lundberg | G06Q 10/107 709/206 |
| 2007/0208816 | A1* | 9/2007 | Baldwin | G06Q 10/107 709/206 |
| 2010/0293601 | A1* | 11/2010 | Schultz | G06F 21/604 726/4 |
| 2013/0074194 | A1* | 3/2013 | White | H04L 51/00 726/28 |
| 2015/0121075 | A1* | 4/2015 | Harjanto | H04L 63/0428 713/170 |
| 2015/0334108 | A1* | 11/2015 | Khalil | G06F 21/31 726/8 |
| 2015/0373031 | A1* | 12/2015 | Hockings | H04L 63/123 726/7 |
| 2016/0359872 | A1* | 12/2016 | Yadav | H04L 43/04 |
| 2017/0006044 | A1* | 1/2017 | Ezra | H04L 63/102 |

* cited by examiner

*Primary Examiner* — Khoi V Le
(74) *Attorney, Agent, or Firm* — Edward Li

(57) ABSTRACT

A computer-implemented method, a computer program product, and a computer system for handling email flows arising from transactions initiated with a shared privileged identity at a service provider. A privileged identity management (PIM) system reads an email sent from a service provider to a single shared PIM email address, wherein the single shared PIM email address is associated with a shared ID and wherein the email is related to a transaction initiated with the shared ID at the service provider. The PIM system analyzes the email by extracting an ID of the transaction and keywords in the email. The PIM system identifies one or more PIM users relevant to the transaction, based on analysis of the email. The PIM system sends a notification of the email to the one or more PIM users relevant to the transaction.

12 Claims, 3 Drawing Sheets

HANDLING EMAIL FLOWS ARISING FROM TRANSACTIONS INITIATED WITH A SHARED PRIVILEGED IDENTITY AT A SERVICE PROVIDER

BACKGROUND

The present invention relates generally to handling email flows, and more particularly to handling email flows arising from transactions initiated with a shared privileged identity at a service provider.

Organizations are increasing deploying privileged identity management (PIM) solutions for managing privileged identities in particular shared/functional IDs that are not tied to any specific user/employee. In a typical PIM scenario, the owner of the shared ID on-boards the ID's credentials into the PIM system and sets up a role for the ID such that only members of this role can have on-demand access to the credentials of the ID. To ensure accountability and traceability of actions performed with the shared ID at the target system, the PIM system enforces a check-out and check-in scheme so as to ensure that only one member of the role is using the ID at any time. So, if a user has checked out the ID from the PIM system and retrieved its latest password, no other member of the role can access the credentials until the user checks in the ID back into the PIM system, whereupon (if needed) the credentials will be rotated to a new value. In advanced PIM solutions, a user goes through a single sign-on (SSO) agent or gateway to check out a shared ID from the PIM system, and then gets auto-logged on to the target system with the checked-out credential; in this case, the user does not even see/know the credentials used.

A PIM system is traditionally used for managing shared access to privileged administrative IDs (e.g., root, administrator, and db2admin) on hosts (e.g., Windows, Linux, etc.), and databases (e.g., DB2, Oracle, etc.). However, the PIM system is increasingly being applied in the line-of-business domain for managing privileged shared access to various applications (usually web apps/sites) of business partners, vendors, suppliers, and other service providers. For example, the owner of the shared ID is the head of the procurement department, sets up an online account each with various suppliers for the purpose of initiating and managing purchases, and wants to allow a team of 5 procurement officers to use these online accounts to liaise with each of the suppliers. The business partners, suppliers, or vendors is a service provider; a customer wants to use a single shared online ID to connect to the service provider.

Many applications, particularly internet-based applications, uses e-mails as an essential way to conduct various workflows, such as secondary authentication, and/or to convey status updates (e.g., order status) and transactional data (e.g., new password) to users. For example, when ordering a virtual machine (VM) or a bare-metal server from an IaaS provider, the user have to wait for an email from the IaaS provider; in the email, the IaaS provider notifies the user of the provision of the VM or the server as well as the IP address and initial admin password of the VM or the server. In another example, when a purchase from an on-line store is initiated, emails are sent upon order confirmation, upon shipping from a warehouse, upon each stage of delivery, and upon final delivery of goods.

If an organization provisions individual IDs to a service provider, it can configure the ID's individual owner's email address with the ID for the service provider to send emails to. However, if an organization provisions a single shared ID to a service provider, then it is not clear whose email address should be configured for the application to send emails to. The shared ID is owned by a PIM user (e.g., a manager); however, since the ID can be used by any member of the corresponding PIM role, it is not clear whose email address should be configured for the service provider application to send emails to.

In a normal workaround, for each owner of a shared ID to request for a shared email address representing a distribution list that maps to multiple employees who are using the ID. However, it is challenging and a burden for both the ID's owner and the organization email administrator to track which user has entitlements to which shared ID in the PIM system and to keep the distribution list in sync with PIM's latest entitlements. This approach also leads to a proliferation of such shared email IDs in the organization's email system (as there will be one created per service provider), which will build-up over time and may stick around even after the ID/account with the service provider is defunct and removed from the PIM system.

Furthermore, if using a distribution list, employees will get spammed with emails not related to their interest. An employee cannot easily pick out what is relevant and of interest, and may end up missing emails that require attention. Emails may get sent to folks who did not use the ID recently. If the mailing list is not kept updated and in-sync with the role memberships in PIM system, the email may not be sent to the actual intended user but sent to employees who no longer belong to the role. In this situation, a PIM user will have to resort to periodically logging into the service provider site or application. This is a very unproductive exercise and adds unnecessary noise to the PIM system's check-in and check-out audit logs. Also, this leaves possibly sensitive email content (e.g., order information) inside user's individual mboxes.

SUMMARY

In one aspect, a computer-implemented method for handling email flows arising from transactions initiated with a shared privileged identity at a service provider is provided. The method includes reading, by a privileged identity management (PIM) system, an email sent from a service provider to a single shared PIM email address, wherein the single shared PIM email address is associated with a shared ID and wherein the email is related to a transaction initiated with the shared ID at the service provider; analyzing, by the PIM system, the email by extracting at least one of an ID of the transaction and keywords in the email; identifying, by the PIM system, one or more PIM users relevant to the transaction, based on analysis of the email; and sending, by the PIM system, a notification of the email of the email to the one or more PIM users relevant to the transaction.

In another aspect, a computer program product for handling email flows arising from transactions initiated with a shared privileged identity at a service provider is provided. The computer program product comprises a computer readable storage medium having program code embodied therewith. The program code is executable to read, by a privileged identity management (PIM) system, an email sent from a service provider to a single shared PIM email address, wherein the single shared PIM email address is associated with a shared ID and wherein the email is related to a transaction initiated with the shared ID at the service provider. The program code is further executable to analyze, by the PIM system, the email by extracting at least one of an ID of the transaction and keywords in the email. The program code is further executable to identify, by the PIM system, one or more PIM users relevant to the transaction, based on analysis of the email. The program code is further executable to send, by the PIM system, a notification of the email to the one or more PIM users relevant to the transaction.

In yet another aspect, a computer system for handling email flows arising from transactions initiated with a shared privileged identity at a service provider is provided. The computer system comprises one or more processors, one or more computer readable tangible storage devices, and program instructions stored on at least one of the one or more computer readable tangible storage devices for execution by at least one of the one or more processors. The program instructions are executable to: read, by a privileged identity management (PIM) system, an email sent from a service provider to a single shared PIM email address, wherein the single shared PIM email address is associated with a shared ID and wherein the email is related to a transaction initiated with the shared ID at the service provider; analyze, by the PIM system, the email by extracting at least one of an ID of the transaction and keywords in the email; identify, by the PIM system, one or more PIM users relevant to the transaction, based on analysis of the email; and send, by the PIM system, a notification of the email to the one or more PIM users relevant to the transaction.

DETAILED DESCRIPTION

Figure 1:
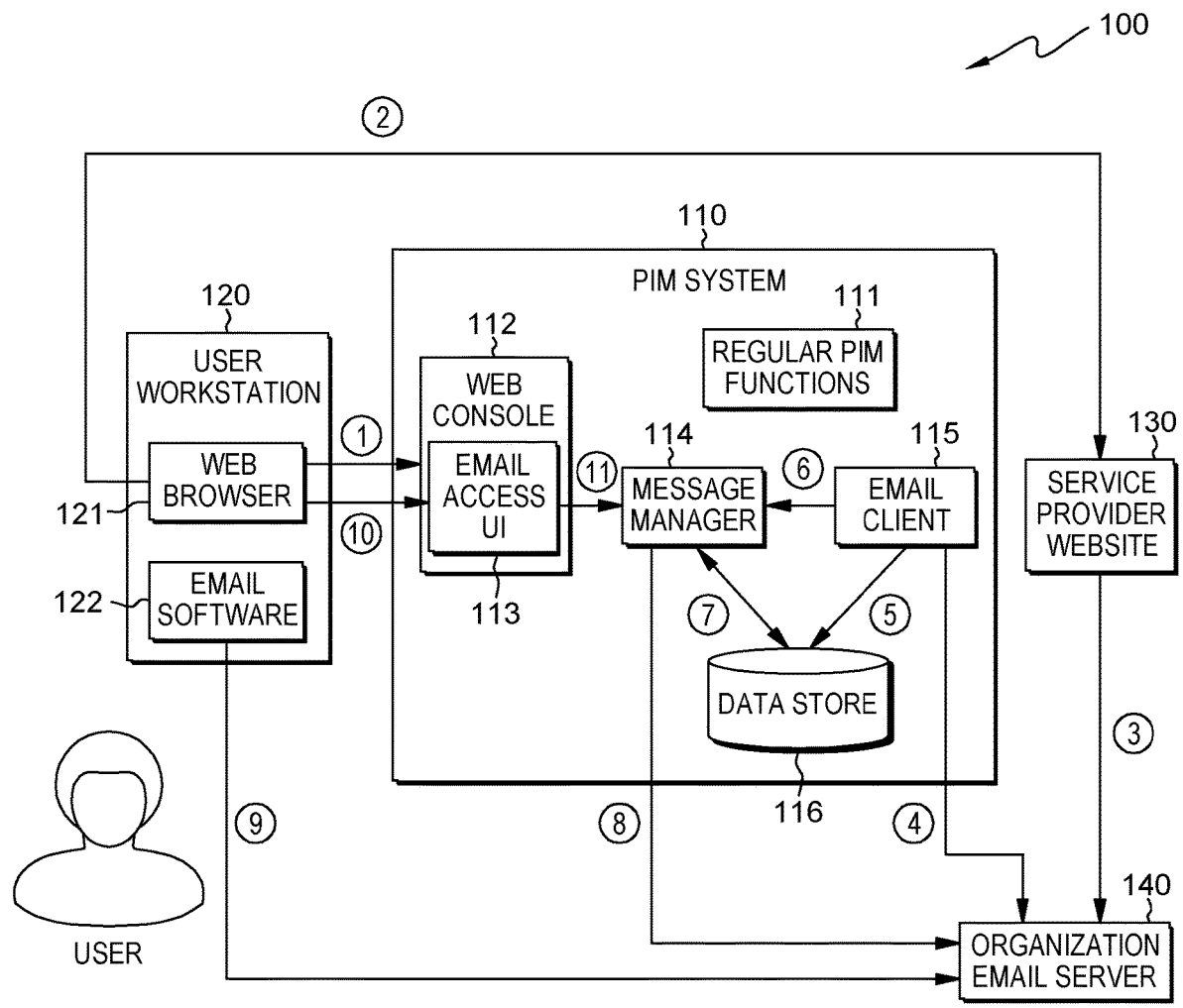
FIG. 1 is a diagram illustrating a system for handling email flows arising from transactions initiated with a shared privileged identity at a service provider, in accordance with one embodiment of the present invention.

Embodiments of the present invention is a proposed enhancement to a typical privileged identity management (PIM) product or solution that supports the use of shared identities to various target systems, in particular, web-based (internet) applications.

The basic idea in the embodiments of the present invention is to have an organization create a single shared email address at a mail server of the organization to serve as the email address that can be configured with a shared ID at each service provider application/site. Emails from these service providers will all be routed to this common email address representing the PIM system.

The proposed enhancement to the typical privileged identity management (PIM) product or solution performs the following functions: (1) to receive incoming emails for the designated shared email account from the mail system into a local mailbox, (2) to identify and notify primary and secondary users of interest to log on to the PIM system to check messages, and (3) to provide access control and tracking of access to the messages in the mailbox.

The proposed PIM system will apply a set of rules to determine which PIM users should be the primary (e.g., for action) and secondary (e.g., for info) recipients of each message coming in. The rules are based on the email's sender, the email's subject or body, as well as the ID's entitlements and a recent check-out history. The proposed PIM system will then send an email notification to these users with the primary recipient in the TO addressee list and optionally the secondary recipients in the CC addressee list. The PIM users will then log on to the PIM system to read/review the new mail from the service provider. The PIM system enforces access control onto the messages in the mailbox, ensuring that only users with the appropriate entitlements can view emails coming in from any specific service provider.

The proposed PIM system uses templates and machine learning techniques to identify transaction IDs and/or keywords embedded in emails from each service provider and thus more accurately determine the primary recipient of interest to an incoming email from a service provider.

The PIM user continues to have timely notification of incoming emails pertaining to transactions that the PIM user has interest in and be able to easily access these emails, while avoiding being spammed by a flux of emails addressed to the shared email address that is of no interest to the PIM user. At the same time, the organization avoids the overheads and messiness of having to create separate shared email addresses (and mboxes) for each shared ID (and service provider), and avoids having to manage the life-cycle of these email address/mboxes as the shared IDs get provisioned or de-commissioned.

In an example, a procurement manager Annie wants to setup a shared online account for the company "JK Enterprises" with an office product supplier "xyz.com". With the proposed enhancement to the PIM product or solution, Annie visits "xyz.com", applies for a new account with ID "jke" and configures the email address "pim@jke.com". Annie also logs on to the PIM system and register this new shared ID with "xyz.com" in the PIM system, and then creates a role "XYZ users" and assign team members such as James to this role. With this configuration, the PIM system assumes (by default) that any emails addressed to "pim@jke.com" and coming from "xyz.com" (e.g., "custsvc@xyz.com") pertains to transactions related to the shared ID. Therefore, whenever "xyz.com" sends an email to "pim@jke.com", the message is routed into the PIM system. However, the PIM system does not give all PIM users full access to the messages sent to "pim@jke.com". The PIM system only allow users of the "XYZ users" role to access e-mails coming from "xyz.com".

Since emails from "xyz.com" are not directed to any PIM user's individual mailbox, users have to rely on the PIM system to provide timely notifications to the appropriate PIM users of any incoming messages from "xyz.com". A simplistic solution of notifying incoming messages to all members of the corresponding PIM role is not satisfactory, since an incoming message of interest to one member will get blasted non-discriminately to all members of the role. Since each PIM user may belong to multiple roles and have entitlements to multiple shared IDs, this leads to perceived "spamming" of the user's personal mailbox and may result in the PIM user's ignoring and missing out on actual notifications of interest.

In the embodiments of the present invention, the proposed PIM system analyzes each incoming message from a service provider to the shared email address and determines the most likely recipient of interest. In the analysis and the determination, the PIM system uses the following criteria: (1) The address of email's sender: Using the address of email's sender, the PIM system determines which service provider and shared ID is involved and thus which PIM role should have access to the email. (2) Members of the PIM role for the shared ID: Using this information, the PIM system determines which users should have access to the email. (3) The check-out history of the shared ID: Using the check-out history, the PIM system determines which of the role members are most likely to be interested in the message. For example, those who have not checked out the shared ID for a service provider for a long time will likely have no interest in recent emails from the service provider. (4) Email's subject and body: For certain transactions, a service provider may send multiple email messages related to the same transaction to the PIM system. The PIM system can thus use transaction IDs and/or keywords in the email subject or contents to determine who is the likely recipient of interest. The PIM system keeps track of the history of transaction IDs and/or keywords in each message from the service provider, as well as which PIM user actually read/acknowledge the earlier emails on the thread. If the transaction ID in an incoming email matches that in an earlier email, it can be used to tie the email to the recipient of interest of the earlier email(s).

Using the criteria mentioned above, for each incoming email, the PIM system determines which users can have access to the email (by default, the shared ID's owner and all members of the associated PIM role) and which users to be notified of the new message, and which users to be placed in the TO and CC list of such notification emails. The shared ID's owner can customize the default rules on who to be notified where appropriate. For example, the shared ID's owner can configure that the PIM system only notifies the primary recipient of interest but not the secondary recipients. The shared ID's owner can override the default mechanism for recognizing transaction IDs by providing a custom template to match against the email subject and/or body. A further variation of this feature is to notify user using other mechanisms such as SMS or push messaging to user's mobile phone number registered in the PIM system.

When the primary user logs into the PIM system to retrieve the email, the primary user is asked to acknowledge that the primary user has read/reviewed the email. If the PIM system has wrongly identified the primary user, the first user can reroute the email to another user, or reroute it back to the PIM system for the PIM system to determine who is the next one the email is routed to (e.g., the owner, or the second previous checked-out user, etc.). All accesses to the email message in the shared email mailbox in the PIM system are tracked and the record is visible to all members in the group.

FIG. 1 is a diagram illustrating system 100 for handling email flows arising from transactions initiated with a shared privileged identity at a service provider, in accordance with one embodiment of the present invention. System 100 includes PIM system 110 which is the proposed additions/enhancements to a typical PIM system. PIM system 110 includes regular PIM functions 110 which is a component of a typical PIM system. The typical PIM system also includes web console 112 and data store 116. Elements of the additions/enhancements includes email access UI (user interface) 113, message manager 114, and email client 115.

Email client 115 fetches emails from organization email server 140. Email client 115 monitors and retrieves emails sent to the designated the PIM email address (pim@jke.com in the above-mentioned example) from various service providers.

Message manager 114 is triggered when a new message is received. Message manager 114 analyzes each incoming email message, extracting transaction IDs and/or keywords. Based on analysis, message manager 114 determines which users to notify for action and/or for info, and then message manager 114 dispatch notifications to each of the users, using their individual email addresses registered with the PIM system.

Message manager 114 is also triggered when a user requests to list or read a message (for access control). Message manager 114 checks whether the user belongs to the right role to have access to the message. In the above-mentioned example, only users of "XYZ users" role can list and read emails sent from "xyz.com".

Furthermore, message manager 114 is also triggered when an email message is read or flagged by a user. Message manager 114 updates audit logs and tracks user's interest in specific transaction IDs and/or keywords.

Email access UI (user interface) 113 is within Web console 112 in PIM system 110. Email access UI 113 is used by a user to list and retrieve email messages that the user has rights to read/review. With email access UI 113, the user is allowed to delete messages, to acknowledge acceptance of messages, or to request the messages be rerouted.

In an embodiment of the present invention, PIM system 110 may comprise a machine learning module that studies the history of emails and user feedback from each service provider so as to identify transaction IDs and keywords embedded in incoming emails. PIM system 110 can be enhanced through typical machine learning techniques. For example, since emails from a service provider's web application typically are machine-generated templates, it is possible for PIM system 110 to learn how to extract transaction IDs (e.g., an order number) and/or keywords (e.g., an IP number of a virtual machine) from emails sent from any specific service provider.

Since the proposed solution includes a step for the recipient to acknowledge or disavow acceptance of each email the recipient read off PIM system 110, such inputs allow PIM system 110 to self-assess whether its determination of recipient of interest is correct or wrong and fine-tunes the learning process.

To further accelerate the learning process, users or recipients may mark out elements in the email that can be used to identify a specific transaction. Alternatively, PIM system 110 can perform a first pass to highlight candidate transaction IDs and/or keywords, and have the user pick/confirm which ID and/or keywords to use.

Some service providers may from time to time send out emails that are not related to transactions, such as marketing/promotional emails. The above-mentioned machine learning and user feedback workflows can also be applied to sieve out such emails from emails pertaining to transactions. For example, if the promotional emails come from a different sender address (e.g. "promo@xyz.com"), it can easily be separated out from transaction emails, and a different notification criteria (e.g., notify the ID's owner only) can be applied to such emails.

A use case is described as follows with reference to FIG. 1. In the above-mentioned example, James is a member of the "XYZ users" role in PIM system 110, and has rights to check out the shared ID "jke" to log on and perform transactions at "xyz.com" (service provide website 130 shown in FIG. 1). First, through web browser 121 in user workstation 120, James logs into PIM system 110 and checks out the shared ID "jke" for "xyz.com"; this process is denoted by ① in FIG. 1. Next, James logs into xyz.com's web site (service provide website 130) with the shared ID, and initiate a transaction (e.g., a purchase order); this process is denoted by ② in FIG. 1. Then, xyz.com sends a transaction email (e.g., confirmation) to "pim@jke.com" (organization email server 140 shown in FIG. 1). The subject of the transaction email is "Order Received: Order No TZ3245143123213". This process is denoted by ③ in FIG. 1.

As denoted by ④ in FIG. 1, email client 115 in PIM system 110 fetches the transaction email from organization email server 140. Then, as denoted by ⑤ in FIG. 1, email client 115 in PIM system 110 saves the transaction email in data store 116. As denoted by ⑥ in FIG. 1, email client 115 in PIM system 110 passes the transaction email to message manager 114.

Message manager 114 analyzes the transaction email and determines that James, who has currently checks out the shared ID for "xyz.com", is the primary recipient of the interest. In the analysis, message manager 114 applies a set of rules to determine which user should be a recipient of the email and retrieves relevant data from data store 116. The relevant data includes, for example, past check-out history of the shared ID used to log on to service provider website 130, past messages involving same transaction ID. In response to determine that James is the primary recipient of the interest, message manager 114 updates the decision in data store 116. The processes mentioned above are denoted by a bi-directional arrow ⑦ in FIG. 1. Then, message manager 114 sends a notification to James's email address in organization email server 140, as denoted by ⑧ in FIG. 1.

James's email client (email software 122) in user workstation 120 picks up the notification from organization email server 140, as denoted by ⑨ in FIG. 1. As denoted by ⑩ in FIG. 1, James reads the transaction email sent from the service provide (xyz.com). Since James is still logged into PIM system 110, James simply clicks on an email link in the notification to enter into email access UI 113 (in PIM system 110 shown in FIG. 1) showing the transaction email message sent from xyz.com. PIM system 110 connects email access UI 113 to massage manager 114; this process is denoted by ⑪ in FIG. 1. Then, massage manager 114 retrieves the transaction email from data store 116. Having initiated the order, James logs off xyz.com web site and then checks in the shared ID back to PIM system 110.

In the meantime, another user Mary (who is also a member of "XYZ users") checks out the same shared ID to visit xyz.com to initiate other transactions. There are transaction emails sent from the xyz.com to "pim@jke.com" (organization email server 140 shown in FIG. 1). Message manager 114 identifies Mary as a primary recipient of interest and sends a notification to Mary's email address in organization email server 140. Now, Mary is the latest person who checks out the shared ID for the service provider.

Later, xyz.com sends another email to "pim@jke.com" confirming the order initiated by James, with subject "Order Confirmed: Order No TZ3245143123213". PIM system 110 matches the transaction ID to the earlier one handled by James and identifies James as a primary recipient of interest of the email with subject "Order Confirmed: Order No TZ3245143123213". Even though Mary is the latest person who checks out the shared ID for the service provider, PIM system 110 will not send a notification of the email to Mary. Instead, PIM system 110 sends a notification to James. After receiving the notification, James logs into PIM system 110, reads the message through web console 112 in PIM system 110, and acknowledges the email. If needed, he can check out the shared ID again to log on to xyz.com to perform any follow-up action.

Figure 2:
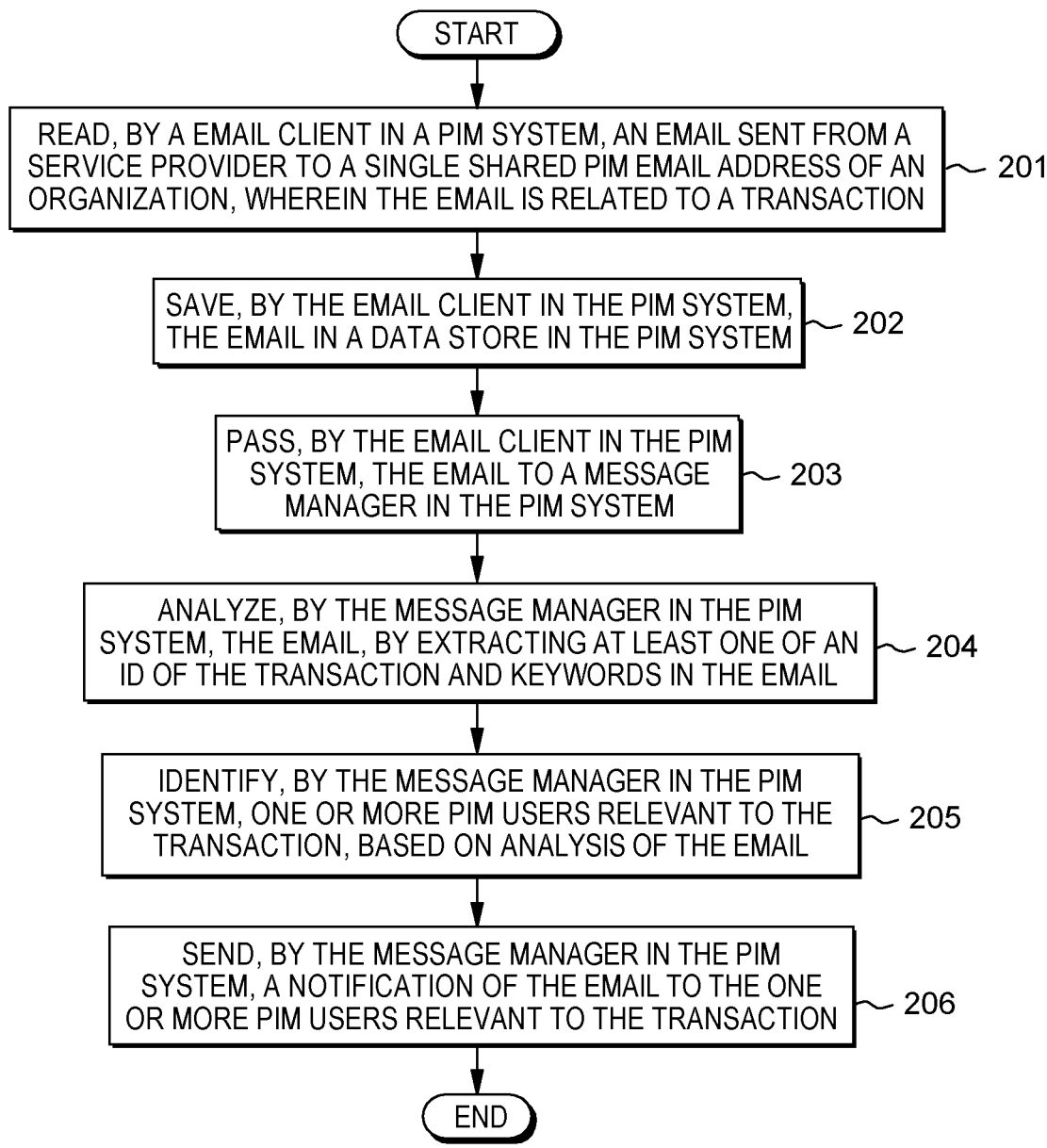
FIG. 2 is a flowchart showing operational steps of a PIM (privileged identity management) system for identifying and notifying a relevant user, in accordance with one embodiment of the present invention.

FIG. 2 is a flowchart showing operational steps of PIM system 100 for identifying and notifying a relevant user, in accordance with one embodiment of the present invention. At step 201, email client 115 in PIM system 100 (shown in FIG. 1) read an email sent from a service provider to a single shared PIM email address. The email is related to a transaction which is initiated with a shared ID at the service provider. The single shared PIM email address is associated with a shared ID. At step 202, email client 115 in PIM system 100 saves the email in data store 116 (shown in FIG. 1) in PIM system 100. At step 203, email client 115 in PIM system 100 passes the email to message manager 114 (shown in FIG. 1) in PIM system 100.

At step 204, message manager 114 in PIM system 100 analyzes the email, BY extracting at least one of an ID of the transaction and keywords in the email. At step 205, message manager 114 in PIM system 100 identifies one or more PIM users relevant to the transaction, based on analysis of the email. At step 206, message manager 114 in PIM system 100 sends a notification of the email to the one or more PIM users relevant to the transaction.

Figure 3:
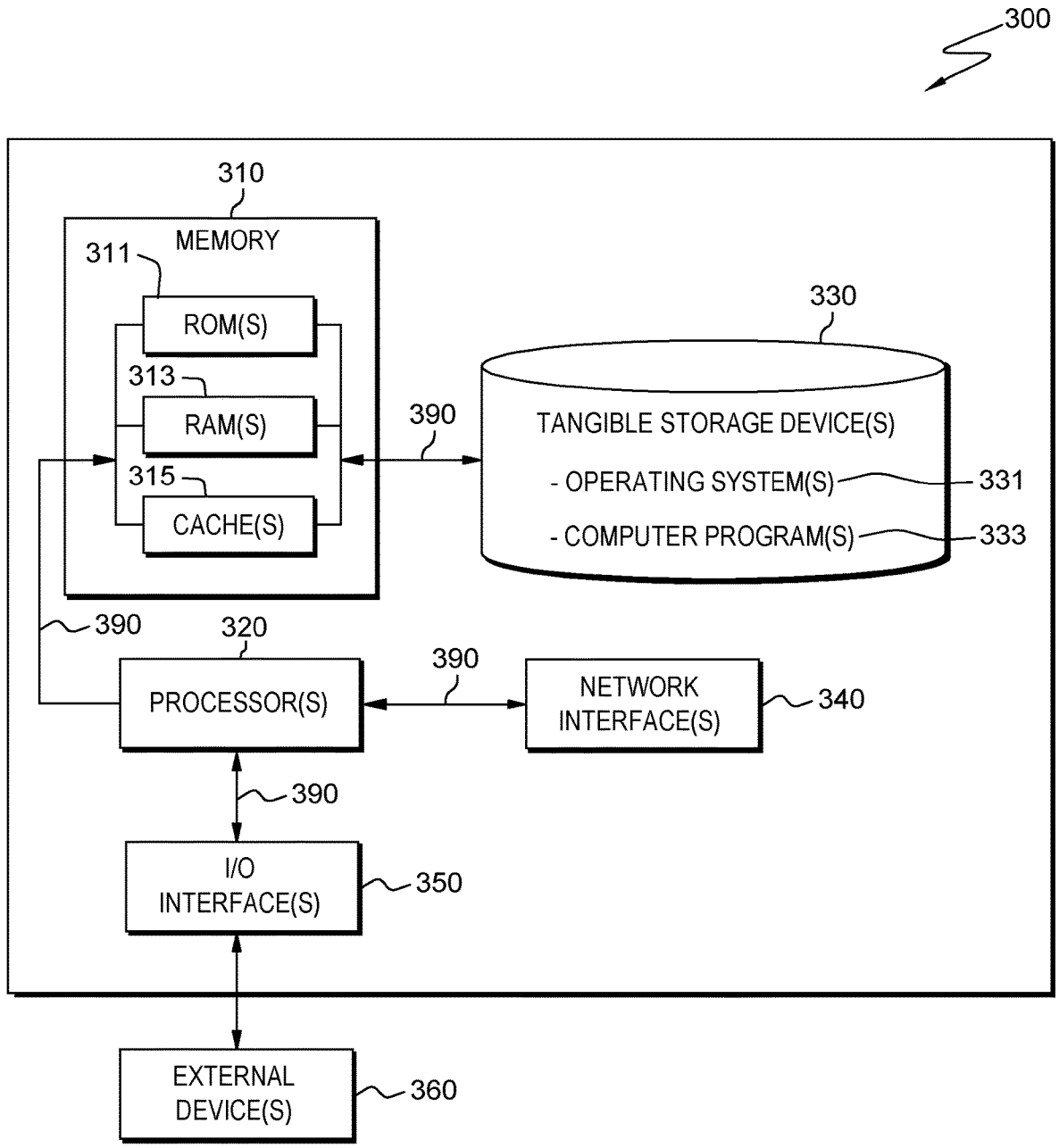
FIG. 3 is a diagram illustrating components of a computer device that implements handling email flows arising from transactions initiated with a shared privileged identity at a service provider, in accordance with one embodiment of the present invention.

FIG. 3 is a diagram illustrating components of computer device 300 that implements handling email flows arising from transactions initiated with a shared privileged identity at a service provider, in accordance with one embodiment of the present invention. It should be appreciated that FIG. 3 provides only an illustration of one implementation and does not imply any limitations with regard to the environment in which different embodiments may be implemented. The computer device may be any electronic device or computing system capable of receiving input from a user, executing computer program instructions, and communicating with another electronic device or computing system via a network.

Referring to FIG. 3, device 300 includes processor(s) 320, memory 310, and tangible storage device(s) 330. In FIG. 3, communications among the above-mentioned components of device 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330. One or more computer programs 333 include PIM system 110. Device 300 further includes I/O interface(s) 350. I/O interface(s) 350 allows for input and output of data with external device(s) 360 that may be connected to device 300. Device 300 further includes network interface(s) 340 for communications between device 300 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for handling email flows arising from transactions initiated with a shared privileged identity at a service provider, the method comprising:
   reading, by a privileged identity management (PIM) system, an email sent from a service provider to a single shared PIM email address, wherein the single shared PIM email address is associated with a shared account registered at the service provider, and wherein the email is related to a transaction initiated with the shared account;
   extracting, by the PIM system, from the email, a transaction ID of the transaction, wherein the transaction ID identifies the transaction, the transaction being independent of the email;
   identifying from a plurality of PIM users sharing the single shared PIM email address, by the PIM system, one or more PIM users relevant to the transaction as one or more recipients of the email, based on the transaction ID;
   sending to the one or more recipients, by the PIM system, a notification of the email related to the transaction; and
   wherein the PIM system comprises a machine learning module, wherein the machine learning module studies at least one of a history of emails and user feedback from the service provider so as to learn how to extract transaction IDs and keywords embedded in incoming emails.

2. The method of claim 1, further comprising:
using, by the PIM system, an email address of the service provider to identify, from the plurality of PIM users, the one or more PIM users relevant to the transaction as the one or more recipients of the email.

3. The method of claim 1, further comprising:
using, by the PIM system, information of PIM user roles to identify, from the plurality of PIM users, the one or more PIM users relevant to the transaction as the one or more recipients of the email.

4. The method of claim 1, further comprising:
using, by the PIM system, a check-out history of the shared account to identify, from the plurality of PIM users, the one or more PIM users relevant to the transaction as the one or more recipients of the email.

5. A computer program product for handling email flows arising from transactions initiated with a shared privileged identity at a service provider, the computer program product comprising a non-transitory computer readable storage medium having program code embodied therewith, the program code executable to:
read, by a privileged identity management (PIM) system, an email sent from a service provider to a single shared PIM email address, wherein the single shared PIM email address is associated with a shared account registered at the service provider, and wherein the email is related to a transaction initiated with the shared account;
extract, by the PIM system, from the email, a transaction ID of the transaction, wherein the transaction ID identifies the transaction, the transaction being independent of the email;
identify from a plurality of PIM users sharing the single shared PIM email address, by the PIM system, one or more PIM users relevant to the transaction as one or more recipients of the email, based on the transaction ID;
send to the one or more recipients, by the PIM system, a notification of the email related to the transaction; and
wherein the PIM system comprises a machine learning module, wherein the machine learning module studies at least one of a history of emails and user feedback from the service provider so as to learn how to extract transaction IDs and keywords embedded in incoming emails.

6. The computer program product of claim 5, further comprising the program code executable to:
use, by the PIM system, an email address of the service provider to identify, from the plurality of PIM users, the one or more PIM users relevant to the transaction as the one or more recipient of the email.

7. The computer program product of claim 5, further comprising the program code executable to:
use, by the PIM system, information of PIM user roles to identify, from the plurality of PIM users, the one or more PIM users relevant to the transaction as the one or more recipients of the email.

8. The computer program product of claim 5, further comprising the program code executable to:
use, by the PIM system, a check-out history of the shared account to identify, from the plurality of PIM users, the one or more PIM users relevant to the transaction as the one or more recipients of the email.

9. A computer system for handling email flows arising from transactions initiated with a shared privileged identity at a service provider, the computer system comprising:
one or more processors, one or more computer readable tangible storage devices, and program instructions stored on at least one of the one or more computer readable tangible storage devices for execution by at least one of the one or more processors, the program instructions executable to:
read, by a privileged identity management (PIM) system, an email sent from a service provider to a single shared PIM email address, wherein the single shared PIM email address is associated with a shared account registered at the service provider, and wherein the email is related to a transaction initiated with the shared account;
extract, by the PIM system, from the email, a transaction ID of the transaction, wherein the transaction ID identifies the transaction, the transaction being independent of the email;
identify from a plurality of PIM users sharing the single shared PIM email address, by the PIM system, one or more PIM users relevant to the transaction as one or more recipients of the email, based on the transaction ID;
send to the one or more recipients, by the PIM system, a notification of the email related to the transaction; and
wherein the PIM system comprises a machine learning module, wherein the machine learning module studies at least one of a history of emails and user feedback from the service provider so as to learn how to extract transaction IDs and keywords embedded in incoming emails.

10. The computer system of claim 9, further comprising the program instructions executable to:
use, by the PIM system, an email address of the service provider to identify, from the plurality of PIM users, the one or more PIM users relevant to the transaction as the one or more recipients of the email.

11. The computer system of claim 9, further comprising the program instructions executable to:
use, by the PIM system, information of PIM user roles to identify, from the plurality of PIM users, the one or more PIM users relevant to the transaction as the one or more recipients of the email.

12. The computer system of claim 9, further comprising the program instructions executable to:
use, by the PIM system, a check-out history of the shared account to identify, from the plurality of PIM users, the one or more PIM users relevant to the transaction as the one or more recipients of the email.

\* \* \* \* \*